April 14, 1959     R. H. OLSON     2,881,564
MACHINE FOR PRESS MOLDING GLASSWARE Filed Jan. 6, 1956     2 Sheets-Sheet 1

Inventor
R. H. OLSON

By Rule and Hoge,
Attorneys

April 14, 1959 R. H. OLSON 2,881,564
MACHINE FOR PRESS MOLDING GLASSWARE
Filed Jan. 6, 1956 2 Sheets-Sheet 2

Inventor
R. H. OLSON

By Rule and Hoge.
Attorneys

United States Patent Office 2,881,564
Patented Apr. 14, 1959

2,881,564

MACHINE FOR PRESS MOLDING GLASSWARE

Ralph H. Olson, Toledo, Ohio, assignor to Owens-Illinois Glass Company, a corporation of Ohio Application January 6, 1956, Serial No. 557,788

9 Claims. (Cl. 49—38)

My invention relates to machines for press molding glassware or other molten or plastic materials for forming various articles. The invention is of use in machines of the type in which a plurality of molding elements are operated simultaneously as by means of fluid operated press plungers for concurrently molding surface portions of the ware. The invention as herein illustrated and described comprises a machine in which a plurality of molding elements are simultaneously operated under fluid pressure for forming parisons which are thereafter blown to the finished form of the molded articles.

In prior art machines of this type in which the molding heads or elements are connected for simultaneous operation by a fluid operated motor it is found that when the molding elements are arrested by the reacting pressure of the molten glass, that such pressure is sometimes unequal, one molding element being brought to rest before a full or sufficient molding pressure has been applied thereby for completing the molding operation. An object of the present invention is to overcome this difficulty. To this end the invention provides a construction wherein plural molding elements or press plunger heads are reciprocated by a fluid operated motor and the molding elements or plungers are individually subjected to the full molding pressure even though one molding element may penetrate the molten glass more deeply than another before being arrested by the resistance of the molded material.

Other objects of the invention will appear hereinafter.

Figure 1:
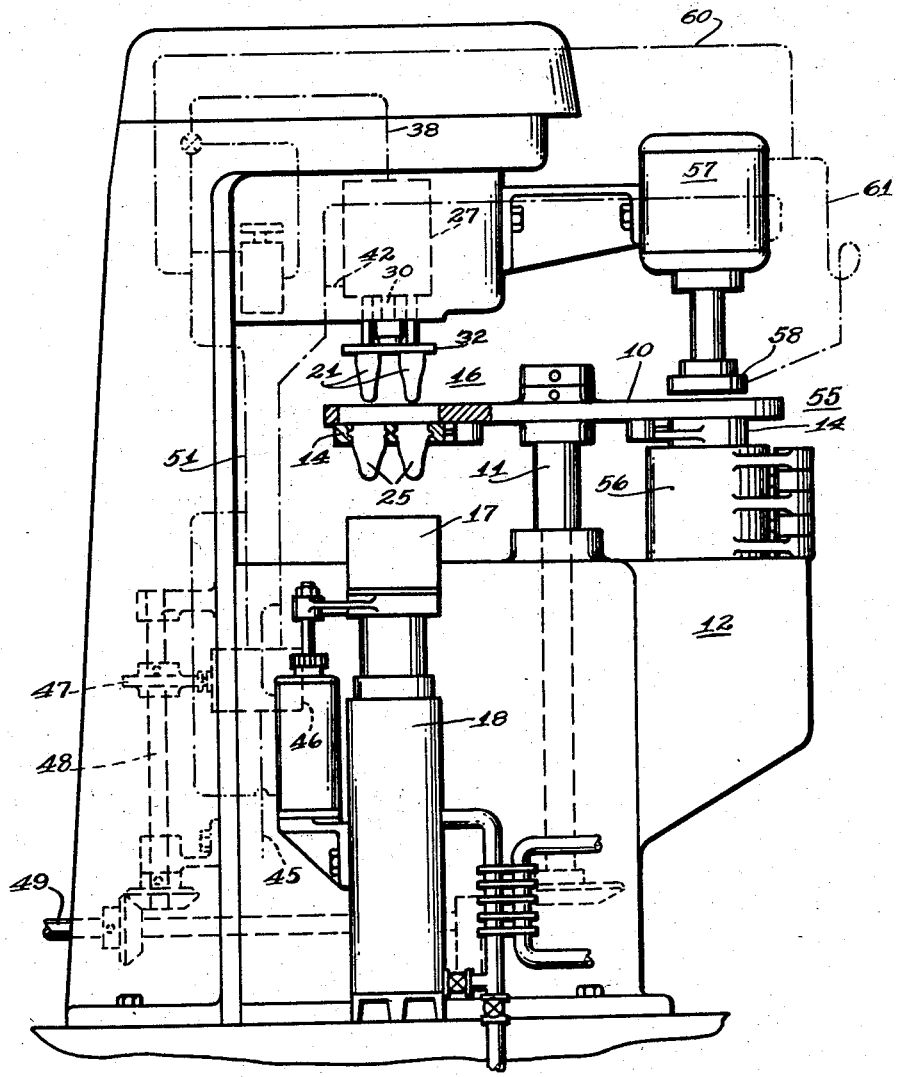
Figure 2:
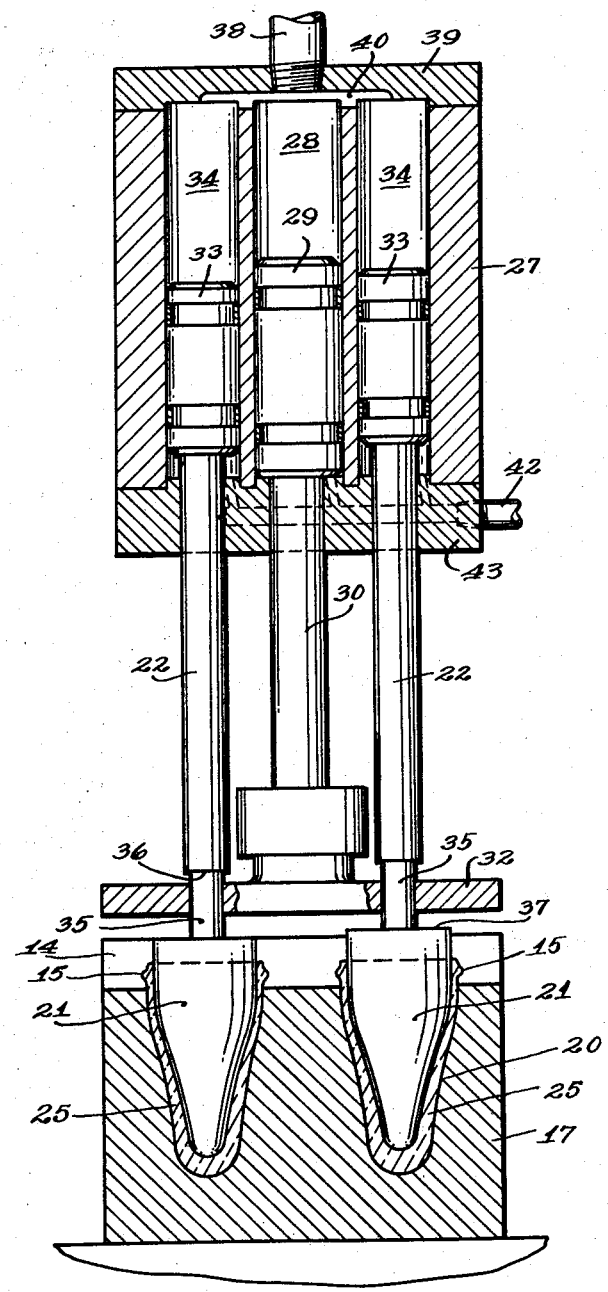

Referring to the accompanying drawings:

Fig. 1 is an elevational view, partly diagrammatic and with parts shown in section, illustrating a press molding machine embodying the present invention; and Fig. 2 is a sectional elevation showing the press plungers and molding units.

Referring to Fig. 1, the machine comprises a mold table 10 keyed to a vertical shaft 11 journalled for rotation in the machine frame 12. Neck or ring molds 14 are mounted on the under side of the mold table, each mold comprising partible sections for forming the neck portion 15 (Fig. 2) of the molded article. The mold table is rotated intermittently, step by step, for bringing the neck molds in succession to a press molding station 16. A parison mold 17 at the station 16 is movable up and down by a cylinder 18.

The parison mold 17 is formed with a plurality of mold cavities 20 which register with the neck mold cavities and form a continuation thereof when the mold 17 is moved upward into engagement with the neck mold 14 at the station 16. Press molding heads 21 attached to vertical plunger rods 22 register with the mold cavities 20 and are movable downward therein for press molding charges of molten glass which have been placed in the mold cavities, thereby forming hollow parisons 25.

The molding elements or heads 21 are lifted and lowered by a fluid operated motor comprising a block or cylinder 27 having a stationary mounting and formed with a central cylindrical bore 28. A piston 29 which reciprocates in the bore 28 is attached to a plunger 30. A head or connecting plate 32 is fixed to the lower end of the plunger 30. The plungers 22 which carry the molding heads 21 are connected to pistons 33 which are reciprocable in vertical cylindrical bores 34 formed in the block 27 at opposite sides of the central bore 28. The plungers 22 are formed at their lower end portions with sections 35 of reduced diameter which extend freely through openings in the plate 32, thereby permitting limited vertical movement of the plate 32 relative to the plungers 22. The limit of this movement in one direction is determined by shoulders 36 and in the opposite direction by the top surfaces 37 of the molding heads 21. The connecting plate 32 provides a lost motion driving connection between the plunger 30 and the molding elements 21.

Fluid, preferably air, under pressure is supplied to the cylinder 27 for operating the plungers 22 and 30. The air is admitted to the cylinder 27 through a pipe 38 which opens through the cover plate 39 of the cylinder into a distributing chamber 40 or channel formed in the inner face of the plate 39. Air under pressure supplied through the pipe 38 is distributed through the channel 40 to the bores 28 and 34 for applying air pressure concurrently to the pistons 29 and 33. The plungers are lifted by air pressure supplied through a pipe 42 in communication with the lower ends of the pistons through a channel in the bottom plate 43.

Air for operating the plunger is supplied through an air pressure line 45 to a valve 46 which is periodically opened by a cam 47 on a timer shaft 48 driven by a power shaft 49. The air under pressure is transmitted from the valve 46 through a line 51 to the cylinder 27.

While the mold table 10 is being indexed and brought to rest with a neck mold 14 at the press molding station 16, the plungers with the heads 21 are in lifted position and the mold 17 in its lowered position. The valve 46 is now operated to supply air pressure for lowering the plungers and concurrently lifting the parison mold 17 up to the neck ring 14. The plungers 30 and 22 may move downward simultaneously as a unit until the central piston 29 is arrested by seating on the bottom plate 43 of the cylinder, the plate 43 thus serving as a stop for arresting the piston 29. By this time the molding heads 21 have entered the mold cavities but have not reached their lowest position and therefore continue their downward movement under the pressure supplied to the plungers 22. The molding heads are thus subjected to equal pressure so that each head completes its movement independently of the other. Thus, as shown in Fig. 2, the left-hand molding head 21 in its fully lowered position is somewhat lower than the right-hand molding head.

The plate 32 serves as a connector between the plunger 30 and the auxiliary plungers 22. This positive connection between the plungers insures the up-and-down movements of the molding heads 21 as the plunger 30 is moved up and down. The plate 32 may seat on the molding heads 21 during the downward movement until after said heads have entered the mold cavities, so that the downward pressure of the plunger 30 assists in the initial molding of the glass. When the plate 32 reaches the limit of its downward movement, determined by the piston 29 striking the bottom plate 43, the lost motion connection between the plate 32 and the plungers permits the continued downward movement of the molding heads. This final downward movement of the molding heads is then due entirely to the pressure on the pistons 33. This pressure is equal on the two molding heads when the pistons 33 are of equal size or diameter. When pressure is supplied through the lower pipe 42 for lifting the plungers, the plate 32 ordinarily will be lifted relative to the plungers 32 for taking up the lost motion. The plunger 30 will then assist in withdrawing the molding heads and lifting them from the molded parisons. The central piston 29 is preferably of larger diameter than the pistons 33 but the proportions may be varied.

After the molding operation, air pressure admitted through the pipe 42 lifts the plunger 30 and plate 32, the latter being brought into contact with the shoulders 36 so that the molding heads 21 are lifted together with the plate 32. The parison mold 17 is withdrawn downward concurrently with the lifting of the molding heads 21 thereby leaving the parisons 25 suspended from the neck mold. Each rotation of the mold table 20 brings one of the neck molds with the hollow parisons suspended therefrom, to the finishing mold station 55. A partible finishing mold 56 receives the parisons 25 when the latter reach the station 55 and then is closed about the parisons. An air operated motor 57 then lowers a blowing head 58 to the neck mold and the parisons are blown to finished form within the finishing mold 56 by air supplied through the blowing head. Air pressure for operating the motor 57 is supplied through the line 51 and a branch line 60. Air pressure is supplied through a line 61 to the blowing head 58.

Modifications may be resorted to within the spirit and scope of my invention.

I claim:

1. A press molding machine comprising molding elements, a cooperating mold, a press plunger, a connecting plate attached to the plunger and having a lost motion connection with said molding elements, said connecting plate thereby providing a lost motion driving connection between the plunger and said elements, said plunger being movable toward and from the mold and operable through said connecting plate to move the molding elements toward and from said mold, stop means for arresting the plunger in a stop position as it completes its movement toward the mold, and means operable independently of pressure supplied through said plunger and while the plunger is in said stop position, for applying pressure to said molding elements individually while the plunger is in said stop position.

2. A press molding machine comprising a parison mold with mold cavities therein, molding heads, a press plunger, a connector comprising a plate having a fixed connection with the plunger and extending between the plunger and said molding heads and having a lost motion connection with the molding heads, said plunger and connector being mounted for movement toward and from the parison mold and operable to move the molding heads into the mold cavities, a stop for arresting the said plunger and plate in a stop position before the molding heads have completed their said movement, and means for applying pressure to each of said molding heads independently of the other and independently of said plunger and plate and thereby moving said heads to final molding positions independently of said connector and while the plunger and connector are in said stop position.

3. The combination set forth in claim 2, said last mentioned means comprising auxiliary plungers individual to said molding heads, and means for applying pressure to said auxiliary plungers individually for moving each of said molding heads to its final position independently of the other.

4. A press molding machine comprising a parison mold with mold cavities therein, press plungers, molding heads connected respectively to said plungers, the plungers being mounted for movement toward and from the parison mold for moving the said heads into and out of the mold cavities, an intermediate press plunger, a connector between said intermediate plunger and said first mentioned plungers and having a lost motion connection with the latter, means for supplying fluid pressure to the plungers for moving the said connector and molding heads toward and from the parison mold, and means for arresting said connector during the movement of the molding heads toward a molding position within the mold cavity and permitting the molding heads to complete their movement under pressure supplied to the first mentioned plungers after the connector is arrested.

5. A press molding machine comprising a parison mold formed with upwardly opening mold cavities, press plungers mounted above the parison mold for up-and-down movement, molding heads connected to the plungers and movable up and down thereby, said heads being in register with the respective mold cavities and movable by the plungers into the cavities for press molding charges of molten glass in said cavities, an intermediate press plunger, a connector plate connected to said intermediate plunger and having a lost motion driving connection with the first mentioned plungers permitting limited up-and-down movement of the intermediate plunger and said plate relative to the said molding heads, means for supplying an operating fluid under pressure to the plungers, for lowering the plungers and carrying the molding heads downwardly into the mold cavities, means for arresting the connector plate before the molding heads have completed their downward movement, whereby each said head completes its downward movement under pressure supplied thereto and independently of the final downward movement of the other molding head.

6. The combination set forth in claim 5 including a neck mold mounted above and in register with the mold cavities in the parison mold.

7. A parison mold having upwardly opening mold cavities formed therein, a piston motor mounted over and spaced above the parison mold, said motor comprising a plunger, auxiliary piston motors individual to the mold cavities and having plungers mounted on opposite sides of said first mentioned plunger, molding heads connected to said auxiliary plungers and movable up and down thereby for moving the molding heads into and out of the mold cavities, a connector attached to the first mentioned plunger and having a lost motion connection with the auxiliary plungers for positively raising and lowering the said molding heads, stop means for arresting said connector during the downward movement in the molding heads before the latter have completed their downward movement, and means for supplying an operating fluid under pressure to the said plungers for lowering and lifting them.

8. A press molding machine comprising a mold table mounted for rotation about a vertical axis, a neck mold mounted on the under side of the table, said table being rotatable for moving the neck mold alternately to a press molding station and a blow molding station, a press plunger mounted at the press molding station and spaced above the mold table, auxiliary plungers mounted at said press molding station, molding heads attached to the auxiliary plungers and positioned above and in register with the neck mold at the press molding station, a parison mold mounted beneath the mold table at said press molding station and formed with upwardly opening mold cavities in vertical register with the said press molding heads, said parison mold being movable upwardly into engagement with the neck mold, a connector connected to said first mentioned press plunger and having a lost motion connection with the auxiliary plungers permitting a limited up-and-down movement of the connector relative to the said auxiliary plungers, stop means for arresting said connector during the downward movement of the plungers, and means for supplying operating fluid pressure to the auxiliary plungers.

9. A press molding machine comprising a press plunger, molding elements, additional press plungers individual to and connected to the molding elements, the said plungers being mounted in parallel relation for reciprocating movement toward and from a press molding position, a connector attached to the first mentioned plunger and having a lost motion driving connection with said additional plungers, means for concurrently applying fluid pressure to all of said plungers and thereby moving them forward from a retracted position toward a press molding position, means forming a stop in position to arrest the first mentioned plunger before the said additional plungers and molding elements have completed their said forward movement the molding elements being free for movement each independently of the other for completing their movement to final molding position after the first mentioned plunger has been arrested.

References Cited in the file of this patent

UNITED STATES PATENTS

| | | |
|---|---|---|
| 628,157 | Cleveland | July 4, 1899 |
| 646,948 | Brookfield et al. | Apr. 10, 1900 |
| 682,906 | Blue | Sept. 17, 1901 |
| 1,982,103 | Hiller | Nov. 27, 1934 |
| 2,569,226 | Carter | Sept. 25, 1951 |